(12) United States Patent
Slattery et al.

(10) Patent No.: US 11,481,921 B2
(45) Date of Patent: Oct. 25, 2022

(54) DETERMINING VEHICLE DWELL TIME WITHIN PREDETERMINED ZONES

(71) Applicant: WORLDCAM LLC, Charlotte, NC (US)

(72) Inventors: Andrew Slattery, Charlotte, NC (US); Shane Pitman, Charlotte, NC (US)

(73) Assignee: WORLDCAM LLC, Charlotte, NC (US)

( * ) Notice: Subject to any disclaimer, the term of this patent is extended or adjusted under 35 U.S.C. 154(b) by 0 days.

(21) Appl. No.: 16/828,456

(22) Filed: Mar. 24, 2020

(65) Prior Publication Data

US 2020/0219282 A1  Jul. 9, 2020

Related U.S. Application Data

(63) Continuation of application No. 15/996,814, filed on Jun. 4, 2018, now Pat. No. 10,628,962.

(60) Provisional application No. 62/583,239, filed on Nov. 8, 2017.

(51) Int. Cl.
  *G06K 9/00* (2022.01)
  *G06T 7/73* (2017.01)
  *H04N 5/247* (2006.01)
  *G06F 3/14* (2006.01)
  *G04F 10/00* (2006.01)
  *G06V 20/52* (2022.01)

(52) U.S. Cl.
  CPC ............... *G06T 7/74* (2017.01); *G04F 10/00* (2013.01); *G06F 3/14* (2013.01); *G06V 20/52* (2022.01); *H04N 5/247* (2013.01); *G06T 2207/30242* (2013.01); *G06T 2207/30256* (2013.01); *G06V 2201/08* (2022.01)

(58) Field of Classification Search
  CPC ............. G01S 13/758; G06K 2209/15; G06K 9/00771; G06K 9/00785; G06K 9/00812; G06Q 30/0613; G06Q 30/0635
  See application file for complete search history.

(56) References Cited

U.S. PATENT DOCUMENTS

| | | | |
|---|---|---|---|
| 10,373,226 B1* | 8/2019 | Russell | G06Q 30/0613 |
| 2012/0092190 A1 | 4/2012 | Stefik et al. | |
| 2014/0104422 A1* | 4/2014 | Choi | G06K 9/4647 348/148 |
| 2015/0127485 A1 | 5/2015 | Kakizawa et al. | |
| 2015/0312529 A1 | 10/2015 | Bernal et al. | |
| 2016/0155328 A1* | 6/2016 | Bernal | G07C 11/00 382/104 |
| 2017/0228944 A1* | 8/2017 | Lan | G06K 9/325 |
| 2018/0349708 A1 | 12/2018 | van Hoof et al. | |

* cited by examiner

*Primary Examiner* — Xin Jia
(74) *Attorney, Agent, or Firm* — Oliff PLC

(57) ABSTRACT

Systems and methods for determining the amount of time that an object occupies a predetermined space are provided. In one implementation, a system comprises a sensor configured to determine a start time when a recognizable object enters a predetermined space. The sensor is further configured to determine an end time when the recognizable object leaves the predetermined space. The system also includes a processing device configured to determine an elapsed time, based on the start time and the end time, when the recognizable object remains in the predetermined space.

20 Claims, 11 Drawing Sheets

| LIVE | DATA | ADMINISTRATION | | | | |
|---|---|---|---|---|---|---|
| DATE ▼ | 9/11/2017 | FOR ALL BAYS | 🔍 SEARCH | ⬇ DOWNLOAD REPORT | ☑ INCLUDE SNAPSHOT IN REPORT? | |
| VEHICLES SERVICED 21 | | AVG. SERVICE TIME 20:33 | | VEHICLE WHO WAITED 10 | AVG. WAIT TIME 08:37 | |
| BAY | START TIME | SERVICE TIME | WAIT TIME | TOTAL CUSTOMER TIME | SNAPSHOT |
| BAY-1 | 2017/09/11 08:54 AM | 16:06 | 00:00 | 16:06 | |
| BAY-2 | 2017/09/11 09:01 AM | 13:23 | 00:00 | 13:23 | |
| BAY-1 | 2017/09/11 10:05 AM | 19:19 | 00:00 | 19:19 | |
| BAY-2 | 2017/09/11 10:10 AM | 14:48 | 00:00 | 14:48 | |
| BAY-1 | 2017/09/11 10:24 AM | 23:19 | 10:27 | 33:46 | |
| BAY-2 | 2017/09/11 10:25 AM | 23:46 | 06:04 | 29:50 | |
| BAY-1 | 2017/09/11 10:48 AM | 29:18 | 00:00 | 29:18 | |

FIG. 5

DETERMINING VEHICLE DWELL TIME WITHIN PREDETERMINED ZONES

CROSS-REFERENCE TO RELATED APPLICATIONS

This is a Continuation of application Ser. No. 15/996,814 filed Jun. 4, 2018, which in turn claims priority to U.S. Provisional Patent Application Ser. No. 62/583,239, filed Nov. 8, 2017, entitled, "Systems and Methods for Determining the Time that an Object Remains in a Predetermined Location," the entirety of which is incorporated by reference herein.

FIELD OF THE INVENTION

The present invention is directed to systems, methods, and analysis software for counting a number of vehicles that occupy predetermined zones over a predetermined time period and for determining the length of time (dwell time) that each vehicle remains within the predetermined zones.

BACKGROUND

Many service businesses strive to provide a satisfying experience for its customers so that customers will continue to visit their establishments. For example, businesses that provide quick oil changes for vehicles may try to perform an oil change service within a certain amount of time. Otherwise, if the service time is too long, customers may become disgruntled and refuse to revisit the establishments. According to another example, a quick service restaurant (QSR) may wish to provide a speedy process for ordering, paying for, and receiving food such that a drive-through customer can place an order, pay for the order, and pick up his or her food all within a reasonable amount of time.

Therefore, there is a need to monitor the amount of time that a customer has to wait to receive a service and to automatically monitor the amount of time that it takes to perform various services for the customer. There is also a need to gather and analyze statistics related to service wait times.

SUMMARY

The present disclosure generally describes various systems and methods for determining the amount of time that an object occupies a predetermined zone. For example, the predetermined zone may be a space where a service is performed for a customer, and may be occupied by a person, vehicle, or other object that is being serviced. In one embodiment, a system for determining vehicle dwell time may include a first camera configured to obtain image data of a first predetermined zone and a second camera configured to obtain image data of a second predetermined zone. The system may further include a processor and a display screen. The processor may be configured to utilize the image data from the first camera to determine if a first condition is met, the first condition being met when any vehicle occupies at least an amount of space in the first predetermined zone greater than a first predetermined threshold. The processor may also be configured to recognize image characteristics of a first vehicle in the first predetermined zone. Also, the processor may determine a first start time when the first condition is first met by the first vehicle and a first end time, after the first start time, when the first condition is no longer met by the first vehicle, and calculate, from the first start time and first end time, a first dwell time that the first vehicle remains in the first predetermined zone. Utilizing the image data from the second camera, the processor is further configured to determine if a second condition is met, the second condition being met when any vehicle occupies at least an amount of space in the second predetermined zone greater than a second predetermined threshold. The processor may also recognize the image characteristics of the first vehicle in the second predetermined zone, and determine a second start time when the second condition is first met by the first vehicle and a second end time, after the second start time, when the second condition is no longer met by the first vehicle. The processor is further configured to calculate, from the second start time and second end time, a second dwell time that the first vehicle remains in the second predetermined zone. The processor can also utilize the first dwell time and second dwell time to calculate a total dwell time, and display an image of the first vehicle and the total dwell time on the display screen.

In another embodiment of a system, a camera may be configured to capture an image of a vehicle in a predetermined space. Also, a processor may be configured to determine a start time when the vehicle enters the predetermined space, determine an end time when the vehicle leaves the predetermined space, and calculate an elapsed time, based on the start time and the end time, when the vehicle remained in the predetermined space.

According to a method for monitoring service time, an exemplary method comprises a step of determining a start time when a vehicle enters a predetermined space. Another step includes determining an end time when the vehicle leaves the predetermined space. Also, the method may include determining a dwell time that the vehicle remains in the predetermined space, the dwell time being determined from the start time and the end time.

Other embodiments of the present invention may be understood from an understanding of the detailed description and are believed to be included within the spirit and scope of the present disclosure.

BRIEF DESCRIPTION OF THE DRAWINGS

FIG. 5 is a second exemplary display view of the computer system display for showing aspects of services at the shop, according to one embodiment.

DETAILED DESCRIPTION

Figure 1:
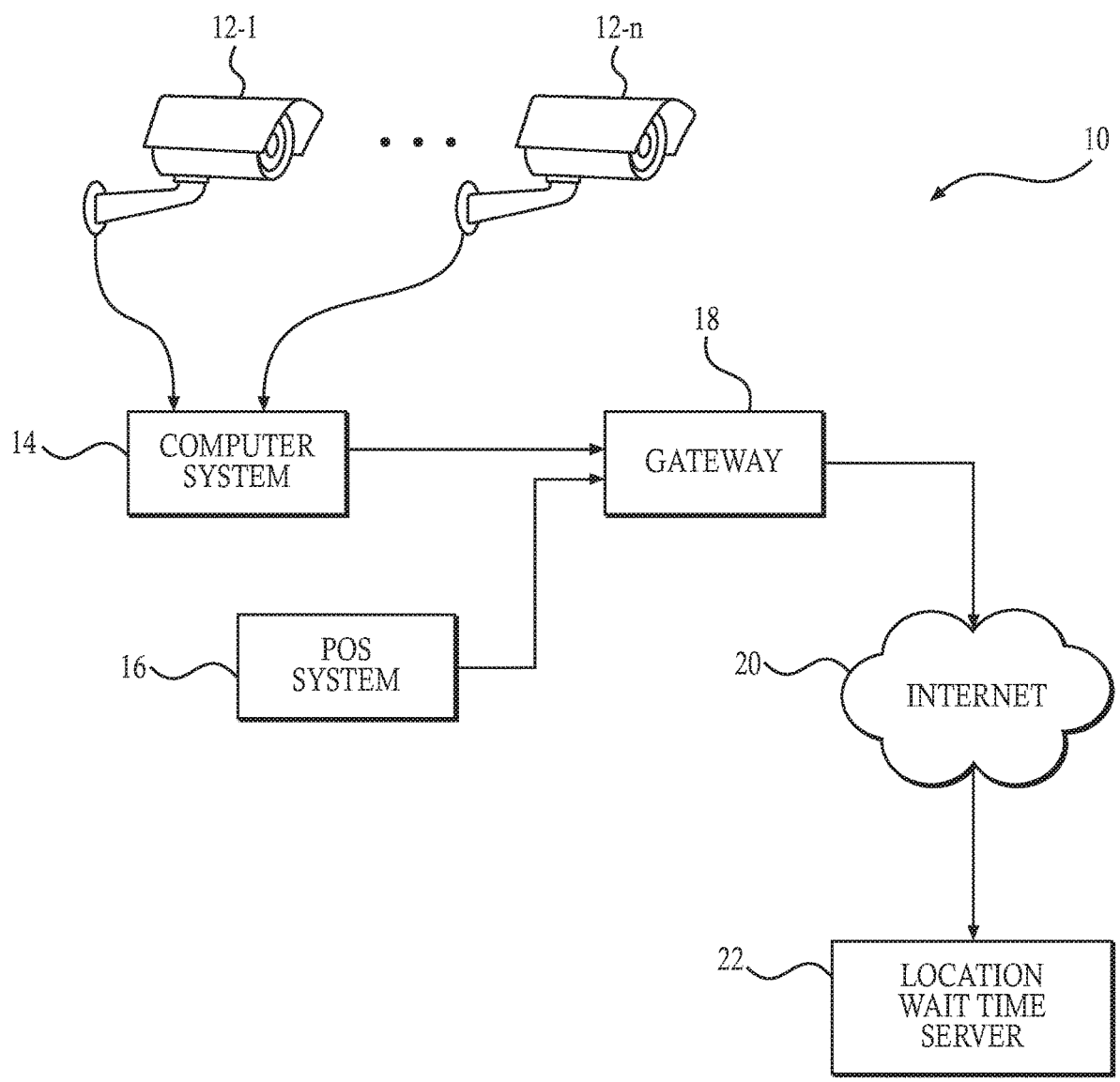
FIG. 1 is a block diagram illustrating a system for monitoring service times or dwell times, according to one embodiment.

The present disclosure is generally directed to systems and methods for monitoring service wait times. Image data may be obtained to determine whether or not a recognizable object occupies a predetermined space or zone. The predetermined zone is a place where the object receives some type of service or waits for service. For example, the objects may be vehicles (e.g., trucks, cars, motorcycles, etc.) or, in alternative embodiments, may be humans (e.g., the customers themselves) or other objects that can be identified by recognition software.

Start times and end times of when the objects occupy the predetermined spaces are used to determine a dwell time (i.e., time that the object remains in the one location). From the total dwell times, statistical analysis can be performed to determine average service times within a designated time frame (e.g., one hour, one day, etc.) for a number of customers, average service times for a particular shop, average service times for a group of shops in a franchise, and other factors.

Image data can be obtained using any suitable type of cameras. For example, certain types of conventional cameras may typically be used to monitor highways, but conventional software used with those systems may simply count the number of cars that pass along a road or lane. In the present application, software is used to provide further processing to keep track of the times that vehicles remain in designated locations and analyze data regarding service wait times.

The way in which the software detects that a vehicle is present within a predetermined zone may include determining that a predetermine volume has displaced an otherwise empty space. In other words, in an initial state where no object is present in the predetermined zone, the image data includes certain characteristics. When an object is present, at least a certain amount of change is detected in the image data when the image data is replaced. When the amount of change is greater than a certain minimum threshold, the software enables the detection of the presence of an object. This algorithm and other algorithms may be used to detect the presence of a vehicle.

The image data and service time analysis can be displayed for the customer's view so that the customer may be informed of the status of the service. In addition, the image data and service times can also be displayed for the viewing by a shop manager or other service professional.

In some embodiments, the system of the present disclosure allows service professionals to set goals regarding service times. The goals may be used as an incentive to motivate employees to provide service to customers within a reasonable amount of time. For instance, in a quick service restaurant (QSR) or fast-food restaurant, goals may be set for various wait times, particularly in a drive-through lane. A first wait time may be defined as a time that a customer has to wait in line before they are able to place an order. A second wait time may be defined as an elapsed time from when the customer finishes placing the order to when the customer reaches a place where the customer can pay for the order. A third time may be defined as a time between paying for the order and actually receiving the food order.

Times can be monitored at each of a number of zones where a vehicle may wait. Then, the total wait time can be determined for each vehicle. When service times are determined and compared with service goals, the service professionals may be motivated to fulfill orders and/or perform services more quickly. If it is determined that service times are too long, the businesses (e.g., quick oil change facilities, QSRs, or other stores or shops) can analyze various aspects of their business processes to determine ways to speed up the services provided to its customers.

These and other advantages and benefits can be achieved using the embodiments described below. It should be noted that the following embodiments are not meant to limit the invention in any way, but are provided merely as examples of possible implementations and may include other embodiments as will become known from an understanding of the present disclosure.

FIG. 1 is a block diagram showing an embodiment of a system 10 for monitoring service times. In this system 10, one or more cameras 12 are used for monitoring one or more areas or zones where a customer waits for service or where service may already be in the process of being performed. The cameras 12 may include video cameras, such as IP cameras, analog/AHD/TVI cameras, general surveillance cameras, fish-eye cameras, etc. The system 10 also includes a computer system 14 that receives image signals (e.g., video signals) from the cameras 12.

According to some embodiments, the cameras 12 and computer system 14 may be configured as a system in and of itself for monitoring service information at one facility, store, shop, etc. In this respect, the single-shop information can be used to monitor service times at just the one shop without communications with other shops.

However, in other embodiments, the system 10 may be configured to gather data from other shops in order that a franchise or other conglomeration of shops can compare service data at each of its respective shops. To this end, the system 10 may further include a point-of-sale (POS) system 16 comprising, for example, one or more POS terminals, a POS router, and other suitable POS components. The POS system 16 may be configured to communicate sales information as needed, although in some embodiments the POS system 16 may be omitted. The system 10 also includes a gateway 18, such as a broadband gateway, for communicating with other computer systems over the Internet 20 or other local area or wide area communication network. The service information can be communicated from each of a number of shops via the Internet 20 to a location wait time server 22.

The location wait time server 22 may be configured to receive service information from multiple shops located at multiple locations. In some embodiments, the location wait time server 22 can process the service information to determine an estimated wait time at each shop. The location wait time server 22 may be configured to upload information that will be made available to multiple customers throughout a region, whereby the customers can access the service information to see the estimated wait times at multiple locations. With this information, a customer, depending on his or her location and schedule, can decide which shop to visit to receive service.

Therefore, FIG. 1 shows the basic connectivity of the various components in the system 10, comprises, among other things, the cameras 12 (e.g., IP cameras) arranged to capture predetermined locations or zones related to services.

For example, the locations or zones may include service bays of a quick lubrication oil change business. Another example may include vehicle lane locations where vehicles may temporarily stop for certain services to be performed, such as a first location where a customer places an order at a drive-through lane of a quick service restaurant (QSR) or fast food restaurant. Other locations may include zones in front of a payment window or a food pick-up window.

In addition to vehicles, the system 10 may also monitor people or other recognizable object within predetermined locations or zones where customers may be waiting in line to be served (e.g., at a bank, DMV, etc.). Multiple cameras 12 may be used to view predetermined locations from a number of different angles and/or to view multiple locations throughout a series of service processes.

Figure 2:
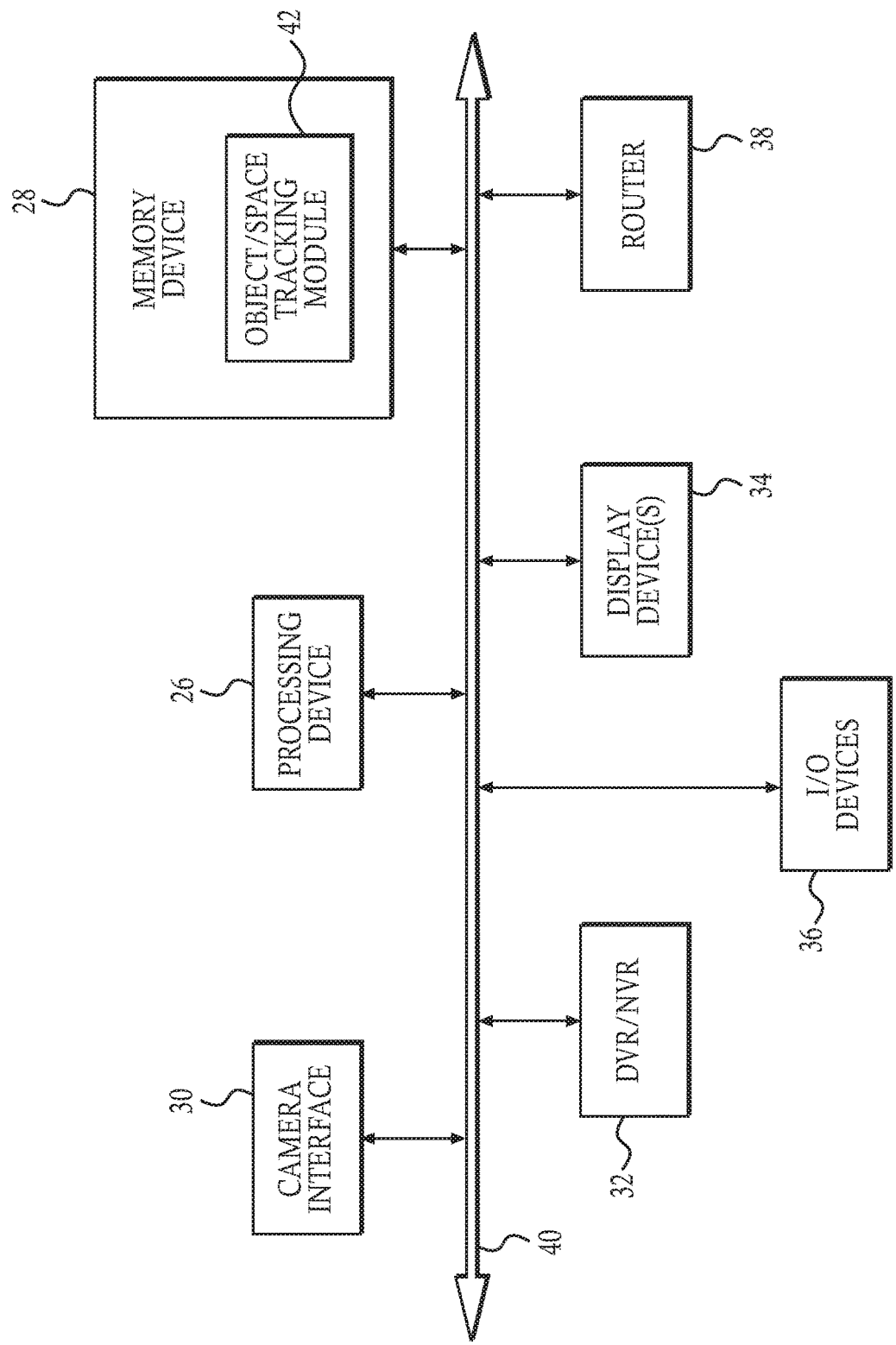
FIG. 2 is a block diagram illustrating the computer system shown in FIG. 1, according to one embodiment.

FIG. 2 is a block diagram of an embodiment of the computer system 14 shown in FIG. 1. The computer system 14, according to this embodiment, includes a processing device 26 (e.g., processor, microprocessor, microcontroller, etc.) for executing logic processes of the computer system 14. The computer system 14 also includes a memory device 28 or memory, a camera interface 30, a digital video recorder or network video recorder (DVR/NVR) 32, one or more display devices 34, other input/output (I/O) devices (e.g., computer peripherals) 36, and a router 38, each interconnected with the processing device 26 via a bus interface 40.

The computer system 14 includes hardware, software, and/or firmware for enabling the execution of programs or methods for monitoring service activities associated with one or more customers. For example, the memory device 28 may store a software or firmware module for monitoring service, such as an object/space tracking module 42. The object/space tracking module 42, for instance, may be configured to track one or more predetermined spaces or zones where services are performed and determine whether or not a recognizable object occupies those spaces or zones and how long the object remains in those spaces or zones.

For example, at an oil change shop, the object/space tracking module 42 can monitor whether a vehicle is positioned in a bay where an oil change can be conducted. Also, in the oil change scenario, the object/space tracking module 42 may be configured to determine how long each vehicle remains in the predetermined zone, which is an indication of how long it takes for the workers at the shop to service the vehicle.

The camera interface 30 may further include a PoE (power over Ethernet) switch or other network switch for for receiving video data from the cameras 12 and switching the IP cameras 12 to the processing device 26. In some embodiments, the video data can be sent directly to one or more display devices 34. For example, live video feed can be provided to a display device 34 that is provided for a customer, whereby the display device 34 in this case may be located in a customer waiting area of an oil change shop. Other live feed can be provided to a display device 34 that may be located in a manager's office, for example, and may be configured for the viewing by one or more workers at the shop. Multiple views from multiple cameras 12 may be provided to each display device 34 according to various embodiments.

In addition to live feed, the video information can also be recorded and stored temporarily or long term in the DVR/NVR 32. Therefore, if an issue arises with respect to service times taking much longer than expected, then video footage can be retrieved and viewed to determine why the service took so long. The processing device 26 may be configured to analyze the video information, either directly from the camera interface 30 or from the DVR/NVR 32. The video information can be analyzed using image recognition processes to determine characteristics of the images. For example, if a shop intends to track vehicles, then the processing device 26 may be configured to recognize when an object in a predetermined location can be identified as a vehicle and how to distinguish vehicles from other objects. The tracking software may be configured in such a way to specifically monitor whether a vehicle having any size or style is positioned in the predetermined location (e.g., in a service bay of an oil change shop).

The router 38 is connected to the PoE switch and is also connected to the DVR/NVR 32, or other device for recording video. The router 38 is also connected to the processing device 26 and memory device 28 of a personal computer, laptop computer, tablet, etc.

The DVR/NVR 32 may also be connected to a microphone or other type of input device 36 for receiving audio, video, or other signals. In embodiments regarding a vehicle service business, the microphone may be mounted in a service bay where the vehicle is serviced. For example, the microphone may be mounted on a bay podium CSR screen on a bottom screen with Chromebit on top.

The router 38 may be connected in the system 10 to a broadband gateway, which may in turn be a gateway for connection to the Internet 20. The system 10 further includes a point-of-sale (POS) router and a POS device of the POS system 16 connected to the broadband gateway 18. If a business has a plurality of store locations, the router 38 of each location may be used to connect the cameras, switches, DVR/NVRs, PCs, and microphone to the Internet 20, where the information can be analyzed by a server.

The system 10 may be used as surveillance equipment to capture, measure, and analyze data. The surveillance equipment may be used in many different types of environments, such as in a quick service restaurant (QSR), a quick lube industry, asphalt/material plants, parking garages, etc. In particular, the cameras 12 in the system 10 may be used to monitor predetermined locations where vehicles, people, or other objects may remain for a certain amount of time.

Software for analyzing the camera views can be stored on a non-transitory computer readable medium (e.g., in the memory device 28) and may include logic that can be executed by the processing device 26. For example, the software may be used to turn the surveillance system into an intelligent network of real-time sensors. According to some embodiments, the software may include the object/space tracking module 42 stored in the memory device 28 and executed by the processing device 26. In other embodiments, the object/space tracking module 42 may be configured, at least partially, as hardware that is incorporated in the processing device 26 or other parts of the computer system 14.

The object/space tracking module 42 may be capable of determining when a predetermine type of object (e.g., vehicle, person, etc.) is located at a predetermined location or zone (e.g., in a service bay, in a queue, etc.). Also, the object/space tracking module 42 can help track logistics of customer vehicle traffic and day-to-day operations and can provide accurate data that is visually verifiable. The object/space tracking module 42 may be able to provide many of the functions of identifying when an object is positioned in the predetermined zones and can measure the amount of time that the object remains in that zone. The object/space tracking module 42 may include sufficient flexibility to be used in various environments where a determination can be made as to whether certain types of objects to be sensed are present or when they first appear in the predetermined zones and when the objects leave that zone.

The object/space tracking module 42 can be easily deployed, scaled, and updated as needed. In some embodiments, the object/space tracking module 42 may be configured as upgradeable firmware in the computer system 14.

In one embodiment, the object/space tracking module 42 may be configured to utilize a first camera 12-1 to determine when a recognizable vehicle enters a zone defined within the view of the camera. The recognizable vehicle may be defined as any object that occupies at least a certain amount or percentage of space within a certain zone in the camera's view. The camera 12 and zones can be set up ahead of time and configured in the system 10 to allow the object/space tracking module 42 to properly distinguish a vehicle from other objects.

A first camera 12-1, such as a fish-eye camera or other 360 degree camera, may be configured to capture multiple lanes. For example, the fish-eye camera can monitor multiple queue lanes of an oil change shop that lead to multiple bays. From the fish-eye view, the object/space tracking module 42 may be configured to designate multiple areas within the camera views that are indicative of waiting zones. Thus, the image data from this one camera may be utilized to determine multiple events (e.g., arriving, leaving) of multiple vehicles in multiple queue lanes. In some embodiments, the image data may also be used to determine multiple positions in the queue lanes.

The first camera 12-1 may detect when the vehicle first occupies at least a minimum amount of space of the detection zone and then records a first time (t1) to indicate when the vehicle first arrives. Alternatively, the system 10 may determine when the vehicle occupies the minimum amount of space, but then may wait until the vehicle comes to a complete stop. A stop condition may be determined when the view of the vehicle no longer changes. Then, the same camera 12-1 may be used to detect when that vehicle leaves that zone such that the vehicle no longer occupies that minimum amount of space within that detection zone and a second time (t2) is determined to indicate when the vehicle leaves that spot. From the first and second times (t1 and t2), a first length of time or dwell time (t2-t1) can be determined representing how long the vehicle occupied the zone.

In some cases, the first dwell time may represent a first zone, such as a queue where a customer's vehicle waits to receive service. In the oil change business scenario, the queue may be located outside the bay. Then, when the vehicle leaves this first area, the vehicle may pull into another zone, such as into the bay itself or other area where service is performed. In a fast food drive-through lane, one zone may be an area next to a menu screen where the customer places an order, a second zone may be an area outside a payment window where the customer pays for the order, and a third zone may be outside of a pick-up window where the customer picks up his or her food.

While the vehicle is in the first zone, the object/space tracking module 42 may be configured to identify the vehicle using recognition algorithms. In the second zone, a second camera 12-2 may be used to capture an image of the vehicle at substantially the same angle and distance from the vehicle so that the image views captured by the two cameras will be substantially the same. In this way, the object/space tracking module 42 may be configured to more easily match up the recognition data to verify that the vehicle captured by the second camera 12-2 is the same vehicle captured by the first camera 12-1.

When the same vehicle arrives within view of the second camera 12-2 and occupies at least the minimum amount of space of the detection zone, a third time (t3) is detected. The object/space tracking module 42 can use an object recognition algorithm to determine if the same vehicle is in the second detection zone. With respect to a drive-through window of a QSR, vehicle recognition may be needed if vehicles from multiple ordering/menu lanes merge into a single payment window lane. Also, vehicle recognition may also be needed if one or more vehicles may be positioned in between the various recognition zones. For example, a front vehicle may be positioned at a pick-up window, a back vehicle may be positioned at a payment window, and one or more vehicles may be positioned between the front and back vehicles. Since these intermediate positions may be outside of any camera detection zones, the object/space tracking module 42 is configured to keep track of the various vehicles to determine the appropriate times for each customer.

Returning to the example of the vehicle having remained in the first zone for a length of time from time t1 to time t2, and then having arrived at the second zone at t3, a fourth time (t4) is detected when the vehicle leaves the second zone. Therefore, an amount of time that the vehicle stays in the second zone (e.g., second dwell time) can be determined by subtracting the third time from the fourth time (t4-t3). To summarize, the second time t2 minus the first time t1 equals the amount of time that the vehicle remains in the first zone; and the fourth time t4 minus the third time t3 is the amount of time that the vehicle remains in the second zone.

The object/space tracking module 42 can also analyze the images from the first camera 12-1 and second camera 12-2 to match up the times t1, t2, t3, and t4 with the appropriate vehicle. The times and running times for each vehicle are monitored continuously. As mentioned above, the cameras 12 may be arranged during a set-up stage so that the view of the vehicle is substantially the same. In this way, the object/space tracking module 42 can properly analyze the tracking of each vehicle by similar image characteristics obtained by each camera 12.

Another way to track a specific vehicle is by analyzing a difference between the second time t2 (i.e., when the vehicle leaves the first zone) and the third time t3 (i.e., when the vehicle arrives at the second zone). For example, in the oil change shop, the vehicle will move from the zone within the queue to a designated position in the bay. The object/space tracking module 42 can determine if the difference in the second and third times (t3-t2) is a reasonable difference. For example, it may be determined that a vehicle will normally take between five seconds and 20 seconds to move from the queue position to the bay position. If the transition time is within normal time limits, then the system 10 determines that this is the same vehicle moving from the zone of the first camera 12-1 to the zone of the second camera 12-2.

Otherwise, an inaccuracy can arise if a customer pulls up to the queue position long enough to be recognized, but then leaves without pulling in the bay. In this scenario, times t1 and t2 may be determined. Then, in this example, if another vehicle pulls into the bay after a maximum transition time (e.g., more than 20 seconds later) with respect to times t2 and t3, the system 10 may determine that this is a different vehicle.

In some situations, a vehicle may not be positioned in the queue long enough to be detected as waiting for service. For example, if t2-t1 is below a certain amount of time (e.g., less than 15 seconds), then the system 10 may determine that the vehicle has not waited for service, but possibly the customer has simply stopped to ask questions.

Considering again the transition time between zones (i.e., from t2 to t3), the transition time from one zone to another may be determined to be legitimate if the time is above a minimum time and below a maximum time. In a QSR environment, a "normal" transition time may be within two to six seconds, or any other reasonable time frame based on various factors. The minimum and maximum times can be established during a set up stage when the system 10 is first installed. The various factors that may be considered during installation may include the length of lanes, sharp curves in the lanes, or other factors that may affect the transition times. Therefore, the system 10 can be customized for each individual store or shop during installation.

During use, the object/space tracking module 42 may be configured to monitor whether a vehicle moves from one zone to another in a reasonable amount of time. This can be used to keep track of different vehicles and to determine other issues, such as a stalled vehicle, a minor auto accident, etc.

Also, the object/space tracking module 42 may be configured to determine a first difference ($\Delta T1$) between the second time t2 mentioned above and the first time t1 and/or a difference ($\Delta T2$) between the fourth time t4 and the third time t3. These time periods ($\Delta T1$ and $\Delta T2$) represent dwell times, or the amounts of time that the vehicle remains in each zone. In an oil change shop, the first time amount ($\Delta T1$) that the vehicle dwells in the first zone (e.g., the queue) may not necessarily represent a customer wait time. For example, if a customer pulls up in the queue, he or she may be greeted by a representative who may obtain customer information and receive instructions regarding what kinds of services the customer wishes to receive. This time would therefore not be counted as a wait time since the customer is actually being serviced. Also, a customer may wish to get information (e.g., cost of services, wait time, etc.) and may then drive away without receiving any services. In some embodiments, the calculated wait time may be reduced if it is determined that the customer was already receiving service (e.g., receiving answers to questions, providing customer information, or involved in other discussions with the service professional). All or a portion of this time can be discarded, based on how the system is initially set up. In some service industries, certain times can be added or subtracted based on various factors that may be unique to the business, such as driving lanes, store layout, business procedures, etc.

The values $\Delta T1$ and $\Delta T2$ can be analyzed by the system 10. A minimum wait time and/or service time may be set to determine if the customer actually remained in the locations long enough to receive a service. For example, in the QSR store, a vehicle may simply be driving around the building. If the vehicle is identified as occupying enough of the zone, but then leaves the zone within a second or so, the object/space tracking module 42 may be configured to identify that this vehicle is not waiting for service, but is simply passing through. If a timer starts to indicate an arrival event, but then the vehicle leaves the zone before the minimum time period is reached (i.e., if t2-t1 is too small), the timer information may be discarded. Otherwise, after the minimum time period is reached, the timer information is kept.

According to another implementation, the system 10 includes information from the POS system 16 to monitor wait times. In conventional systems, service time at a vehicle repair or oil change shop may start when a vehicle identification number (VIN) is first entered into a POS device. The service end time may be recognized at the time the customer pays for the service using the POS device. However, the total wait time may be inaccurate because it relies on the entry of the VIN number to start the timer. On the other hand, the timers of the present disclosure use information obtained from cameras 12 to determine a real time when a customer actually arrives at the shop. Thus, the system 10 of the present disclosure can provide much more accurate wait time information.

Also, the POS system 16 may be used to match the services that the customer receives with the customer wait times. Therefore, the system 10 can determine if the wait time is appropriate with respect to the services received. For example, if a customer only receives an oil change, then a predetermined amount of time should be expected to complete the service. However, if a customer receives multiple services (e.g., an oil change, transmission service, differential service, etc.), the longer wait time would be expected. Therefore, based on information obtained from the POS system 16 regarding services received and paid for, the system 10 can determine if the wait time for those services is normal.

A "snapshot" of the vehicle may be recorded after the vehicle has remained in a service zone for a predetermined time period. The snapshot can be matched with payment information of the POS system 16. In some embodiments, the snapshot can be displayed for the customer to see to verify that they are paying for the correct vehicle and service. The snapshot information can also be used in a QSR drive-through to enable a cashier at a payment window to match up the correct order with the correct vehicle. The same snapshot information can also be provided to the person at the food presenting window to make sure that the customer is picking up the correct order.

The system 10 may include storing video footage from the cameras 12 in the DVR/NVR 32. Then, if a simple service took much longer than expected, the system 10 may be configured to allow a manager to look at the footage to find out why the service took so long. The video footage can also be used for other purposes as well, as will be understood by one of ordinary skill in the art.

Figure 3:
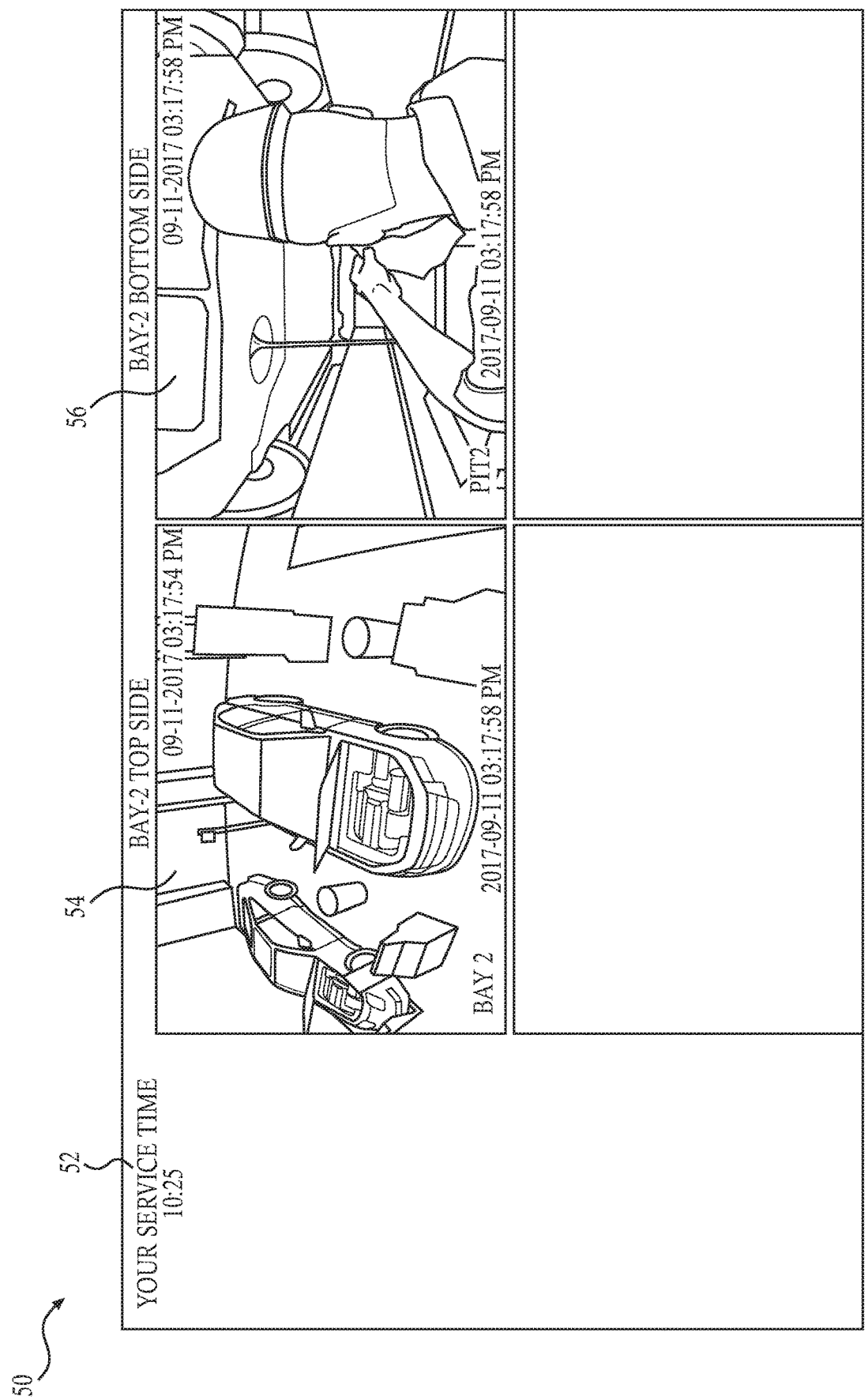
FIG. 3 is an exemplary display view of a customer display device for showing aspects of a service performed for a customer, according to one embodiment.

FIG. 3 shows an example of a display view 50 of a customer display device 34 according to one embodiment. The display view 50 may be configured to show aspects of a service that is being performed for a customer. For instance, in the example shown in FIG. 3, the customer, perhaps waiting in a waiting area of an oil change shop, may be able to view the display view 50 on a monitor or television screen to see the progress being made to the customer's vehicle.

The display view 50 may include a service time display 52, which may be configured to show a running time of how long the service has been taking. In this example, the service time display may show a message such as "Your service time is:" along with the running time (e.g., "10:25" in this example). Therefore, the customer will know how long the service is taking. In some embodiments, the displayed service time 52 may include just the time of the actual servicing of the vehicle, while in other embodiments, the displayed service time 52 may also include the wait time in the queue before the vehicle was driven into the bay.

Also illustrated in the display view 50 is a first camera view 54 and a second camera view 56. It should be known that any number of camera views (e.g., zero, one, or multiple camera views) can be included in the display view 50. In the embodiment illustrated in FIG. 3, it should be understood that multiple cameras 12 (i.e., two in this example) are used to show different views of the one zone where the vehicle receives service.

From the display view 50, a customer can see when his or her vehicle has entered the bay and when the service time display 52 resets to 0:00 to begin running the service time. The customer can also see, from the first and second camera views 54, 56 the progress being made on the vehicle.

One camera 12 (i.e., the camera that captures the view 54) may be used for two purposes. A first purpose is to provide the view shown in the first camera view 54 that is displayed in a display device 34, which may be viewable by a customer or an employee of the shop. A second purpose is to sense when a vehicle enters or leaves the bay or other predetermined zone, as mentioned above.

The other view (i.e., the second camera view 56) may show a view from a second camera 12. In this example, the second camera 12 may show a second view from a below-ground position. This view shows a mechanic or other service professional performing some type of service on the vehicle. For example, in the illustrated example, the second camera view 56 shows the service of removing old motor oil from the vehicle. The three views, that is, the service time display 52, the bay view (or first camera view 54), and the below-ground view (or second camera view 56) may be displayed on a single customer display device 34 or on multiple display devices 34 provided for the customer. For example, the one or more displays may be located in a waiting area.

Figure 4:
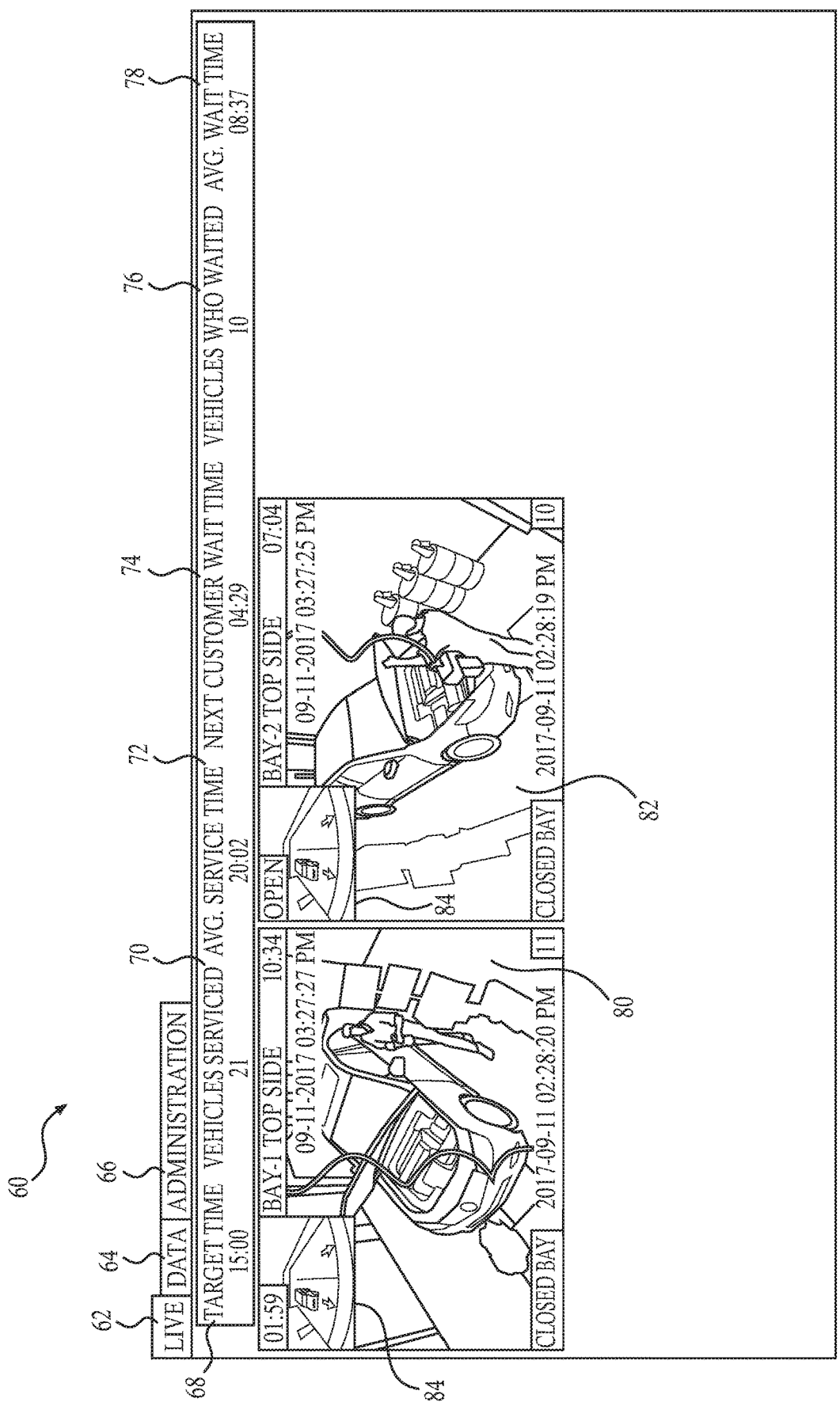
FIG. 4 is a first exemplary display view of a computer system display for showing aspects of services at a shop, according to one embodiment.

FIG. 4 shows another example of an embodiment of a display device 34, 36. In this embodiment, the display device 34, 36 shows a display view 60 on a computer screen of the computer system 14. The display view 60 can be configured to show aspects of in-progress services at a shop.

According to FIG. 4, the display view 60 shows a screen shot or graphical user interface (GUI) that may be displayed on a screen of the computer system 14 that is used by a service professional. In this example, the computer system 14 may be available only to the people who work at an oil change shop. The display view 60 allows the user to view three different pages, which can be accessed using selectable tabs 62, 64, 66 at the top of the window of the display view 60. FIG. 4 shows the display view 60 representing when a "live" tab 62 has been selected, allowing the user to see the current status of the shop. One or more camera views from cameras 12 may be displayed in the "live" screen.

The GUI or display view 60 of the "live" feed may also include a "target time" display 68, a "vehicles serviced" display 70, an "average service time" display 72, a "next customer wait time" display 74, a "vehicles who waited" display 76, and an "average wait time" display 78. As shown in the example, the display view 60 shows that the target time display 68 shows a target of "15:00" or 15 minutes, which may be a goal for the service technicians. In other words, based on management goals for the store or for a number of stores in a region, the service technician can see the time that is allotted for performing the oil change is 15 minutes.

In the example, the display view 60 also shows that "21" vehicles have been serviced over a predetermined time period (e.g., the present day). At the end of servicing when a vehicle leaves the bay at the fourth time t4, the system 10 not only records the time period ΔT2, but also counts that vehicle in the number of vehicles that have been serviced.

The average service time in this example is 20:02. This average time can be computed from the total time that it took for all the vehicles to receive service divided by the number of vehicles serviced.

Data regarding the next customer wait time (e.g., 04:29), the number of vehicles that have waited for service (e.g., 10), and the average wait time (e.g., 08:37) can be monitored by the system. These values are also displayed on the display view 60.

The GUI or display view 60 may also include one or more views 80, 82 of the bay or bays and/or views of below-ground cameras, etc. For example, view 80 shows a Bay-1 top side view of a vehicle being serviced. The running time is shown as "10:34" in this example. Also, another view in the top left-hand corner of the view 80 shows a predetermined space where another camera 12 is used to view a queue behind Bay-1. In this example, a vehicle has been waiting in the queue for 1:59.

Also, view 82 is a Bay-2 top side view and has a running time of "7:04" in this example. Another "in-screen" view in the top left-hand corner of view 82 shows a queue behind Bay 2 where a vehicle is waiting to receive service in Bay 2, which is indicated as "open" to show that no vehicle is in the queue for Bay 2.

FIG. 5 shows an example of another embodiment of a display view 90 that is displayed when the user of the computer system 14 selects the "data" tab 64. The display view 90 allows the user to see details of the different customers that have had vehicles serviced. The display view 90 may show the bay 92 that was being used and the start time 94 or t3 that the object/space tracking module 42 detected when a vehicle first arrived in the bay. In some embodiments, an end time column, not shown, may be included to show when (i.e., t4) the object/space tracking module 42 senses that the vehicle had left the bay. The display view 90 GUI may also include a service time 96 that is calculated based on the start time 94 and end time or based on a running time from the start time 94.

If the shop includes a vehicle queue camera that captures when a vehicle first arrives at a location where a customer intends to receive a service, then this camera and the associated software functionality may be used to determine if the customer had to wait for service, which is displayed as a "wait time" 98 (i.e., ΔT1). If not, the wait time will be 00:00. However, if it is determined that the customer had to wait, the camera for detecting the wait time can detect how long the customer waits before service. The service time 96 and wait time 98 can be added together to calculate the total customer time 100, shown in the next column of the GUI of the display view 90, which can be calculated as ΔT1 plus ΔT2. The last column 102 may include a stored snapshot of a view of the particular vehicle being serviced with respect to the other service data.

Figure 6:
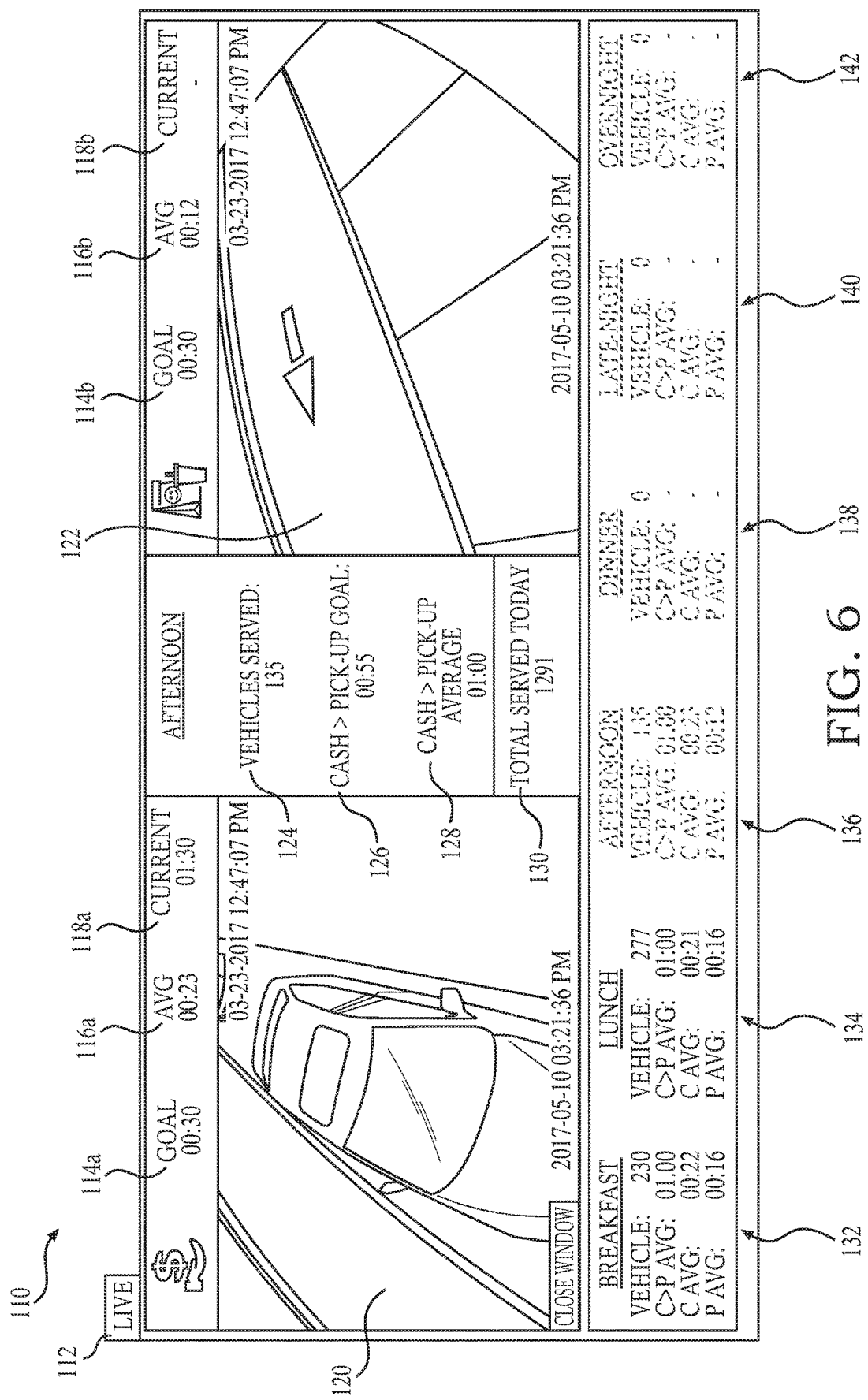
FIG. 6 is a third exemplary display view of the computer system display for showing aspects of services at multiple locations of a store, according to one embodiment.

FIG. 6 shows another display view 110, displayed on display device 34 or I/O device 36 of the computer system 14. In the example of FIG. 6, the display view 110 is configured for showing aspects of services at multiple locations of a store. For example, when a service includes multiple stages, then the multiple locations or zones representing the various stages are monitored. In a quick service restaurant (QSR), the various stages may include a first stage of waiting in a queue before placing an order, a second stage of placing the order, a third stage of waiting to pay for the order, a fourth stage of paying for the order, a fifth stage of waiting to pick-up the order, and a sixth stage of picking up the order. In some embodiments, some of these six stages may be combined for simplicity.

The QSR as shown in the example of FIG. 6 may include a number of predetermined locations where a customer vehicle may remain for a measurable amount of time. For example, a first location may be an "order" location where a customer orders food. The next location may be in front of a window where the customer pays a cashier for the food, as shown in the camera view 120. The third location may be in front of a window where the customer picks up their food, as shown in the camera view 122. In some embodiments, there may be Order, Pay, and Pick-Up locations shown in the various camera views.

The display view 110 may be displayed only for viewing by someone working at the QSR (e.g., a restaurant manager) using a personal computer. The display view 110 in this example shows two of the multiple locations mentioned above, but fewer or more views may be displayed in the display view 110.

In addition to the camera views, the object/space tracking module 42 may be configured to calculate times and averages based on an analysis of the camera views. For example, the display view 110 may include a goal 114a (e.g., 30 seconds), an average 116a (e.g., 23 seconds), and a current running time 118a (e.g., 01:30) for a current customer. The goal, average, and current times may also be shown with respect to a first location (e.g., Pay). Another location (e.g., Pick-up) may also have another goal 114b (e.g., 30 seconds), an average 116b (e.g., 12 seconds), and a current running time 118b for a current customer.

In addition, the display view 110 may include a "vehicles served" display 124 (e.g., total number of the vehicles served during the day) (e.g., 135), a "Cash to Pick-up Goal" 126, which refers to the goal for the time that it takes for a customer to stop in the pay zone ("Cash") and the pick-up zone ("Pick-up") drive through lane positions. The time is calculated by the object/space tracking module 42 from the moment a customer arrives at the window to pay for his or her food to the moment when the customer has received his or her food at the next window and drives away. In this example, the cash to pick-up time is 00:55 (or 55 seconds). Also, the cash to pick-up average display 128 is shown and a "total served today" display 130 of the total number of customers served that day (e.g., 1291).

The Cash to Pick-Up (Cash>Pick-Up) may refer to stops in the drive thru lanes. The system may actually time all three stops in a drive thru lane: Order, Pay, and Pick-up. The user (e.g., store manager) may initially set up target times and the system 10 is able to measure times against those targets. The GUI may include various colors to represent different actual times with target times. The colors may represent whether they are under target time (green), nearing target time (yellow), or over their target time (red). The Cash to Pick-up average 128 is simply a running average time at each stop of the drive thru, for a particular location.

In addition, the display view 110 may also include breakfast statistics 132, lunch statistics 134, afternoon statistics 136, dinner statistics 138, late-night statistics 140, and overnight statistics 142. Each of these categories may be used to determine the number customers and the various averages during each of those times during the day.

Figure 7:
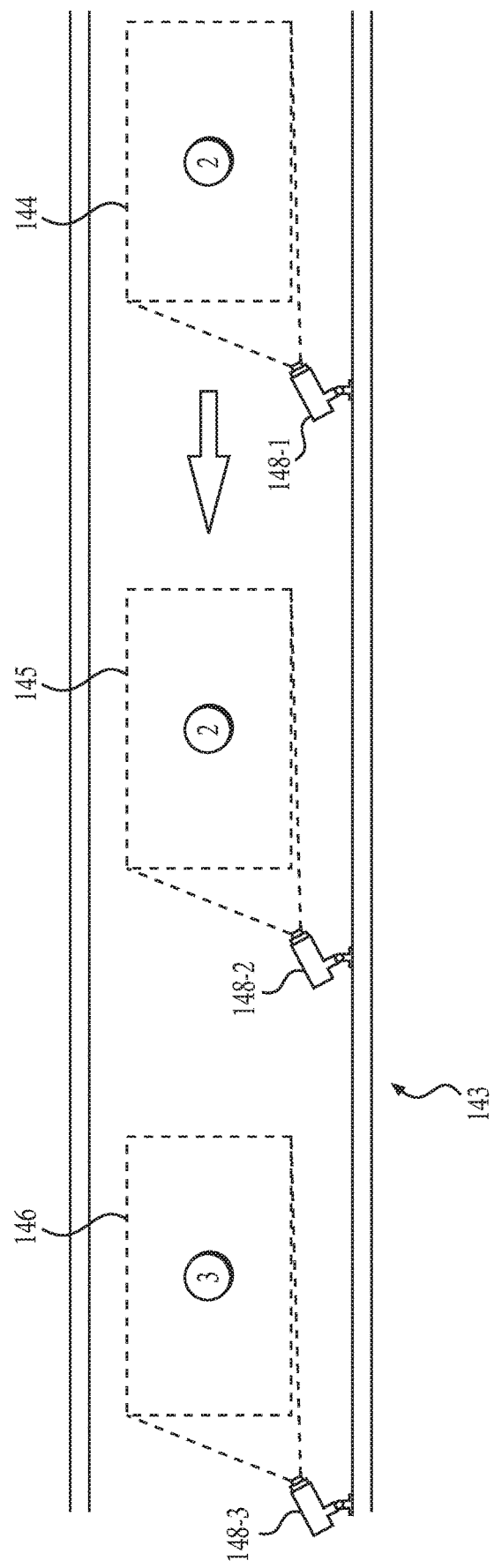
FIG. 7 is a diagram showing a plan view of a vehicle lane that includes multiple predetermined zones where the presence of vehicles is detected, according to one embodiment.

FIG. 7 shows a vehicle lane 143 where multiple services are performed. The vehicle lane 143 includes a first predetermined zone 144, a second predetermined zone 145, and a third predetermined zone 146. In other embodiments, the vehicle lane 143 may include fewer or more predetermined zones. As an example, the first predetermined zone 144 may be an ordering zone, the second predetermined zone 145 may be a payment zone, and the third predetermined zone 146 may be a food pick-up zone.

In addition, during an installation phase, cameras may be installed to monitor each of the zones 144, 145, 146. For example, a first camera 148-1 is configured to monitor the first predetermined zone 144, a second camera 148-2 is configured to monitor the second predetermined zone 145, and a third camera 148-3 is configured to monitor the third predetermined zone 146. Preferably, the cameras 148 are positioned at the same height and angle with respect to the vehicle lane 143 in order that the object/space tracking module 42 is able to recognize the same vehicle at different times in the sequence of services, regardless of whether one or more vehicles are positioned before and or after the vehicle. The object/space tracking module 42 may be configured to determine dwell times for each vehicle at each zone 144, 145, 146 and calculate totals and averages as needed.

Figure 8:
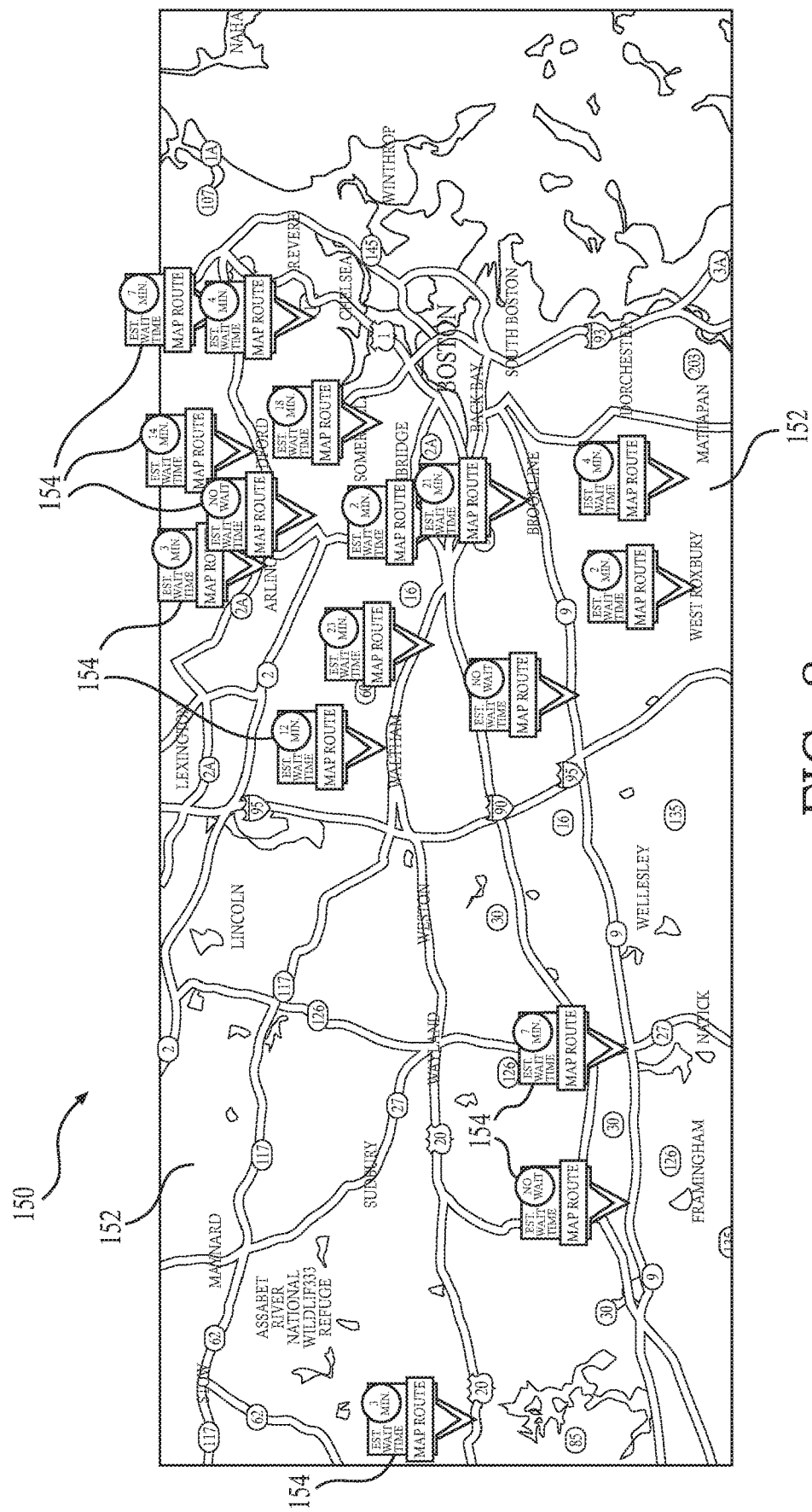
FIG. 8 is a screen display view of a customer mobile device for showing wait times at multiple shop locations, according to one embodiment.

FIG. 8 shows an embodiment of a screen display view 150 that may be shown on a customer mobile device for indicating estimated wait times at each of multiple shop locations. As mentioned above, the location wait time server 22 shown in FIG. 1 can be configured to receive wait times from multiple locations. For example, if an oil change company owns multiple stores within a region, the wait times from each location can be communicated to the location wait time server 22, which in turn can upload this information to a website that displays up to the minute information about the wait times at those shops. From this information, a customer can determine where they can go to get the fastest service or determine if the shop nearest to them is busy.

In some embodiments, a wait time application may be available to customers. An example of the screen shot (e.g., display view 150) of the wait time application is shown in FIG. 8. The display view 150 includes a map 152 of a region, such as a region centered around the current location of the user. Thus, the application may use GPS to determine the location of the user or the user may enter a center location around which the map 152 can be created.

In this embodiment, a number of icons representing store locations 154 may be displayed on the map 152. Information from each store can be managed by a central computer or server (i.e., the location wait time server 22 shown in FIG. 1) via the Internet 20 and combined to form the illustrated screen shot 150. The location wait time server 22 may be configured to estimate the wait time that a customer may experience if he or she were to visit the stores at that particular time. The wait time application may be accessible via a personal computer, mobile device (e.g., smart phone), or other device able to access a web site associated with the service company. The user may also be able to click on a "map route" associated with each shop marker or store location 154 that would assist the user with directions to the particular shops.

Figure 9:
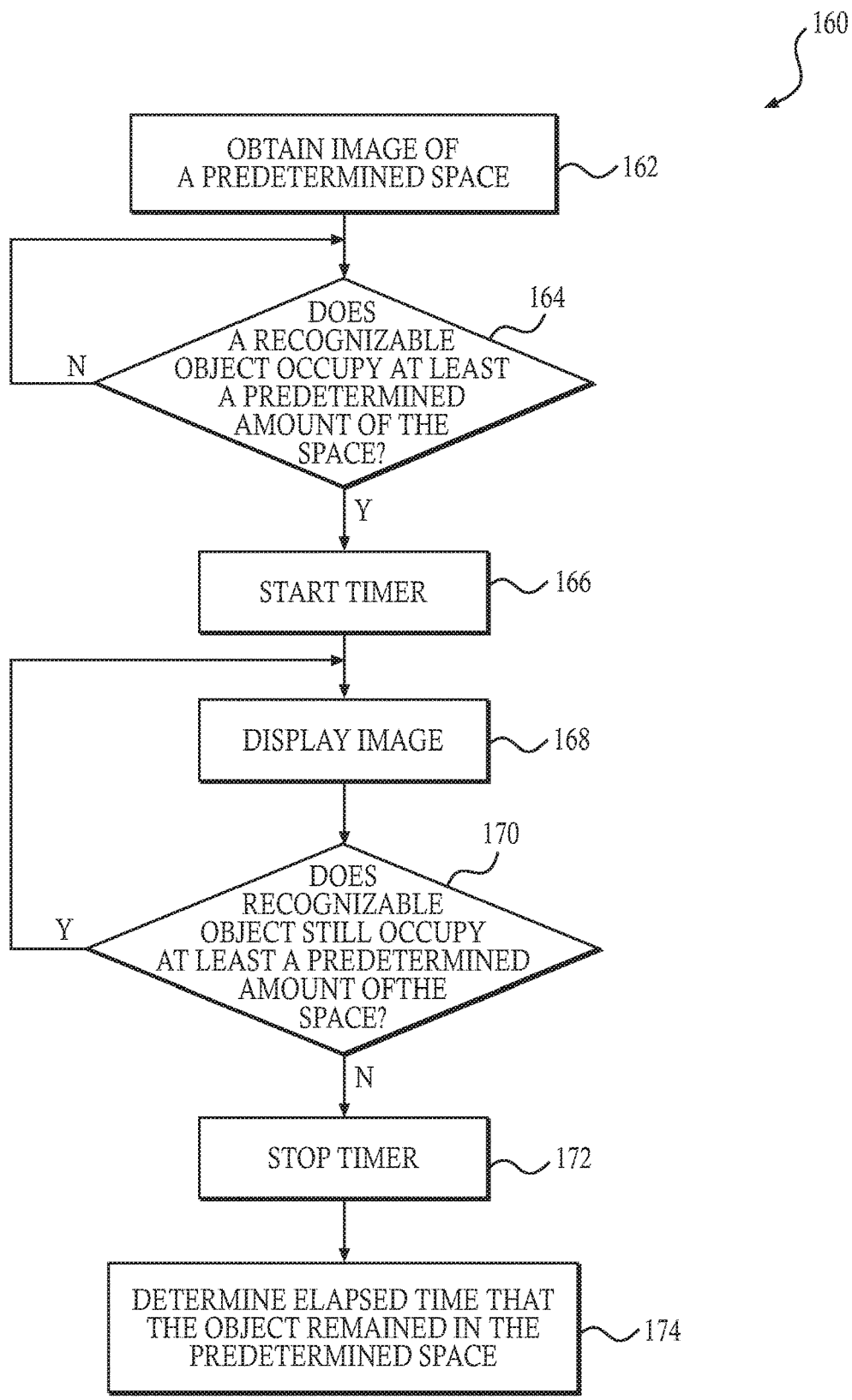
FIG. 9 is a flow diagram showing a method for determining a time that an object remains at a location, according to one embodiment.

FIG. 9 is a flow diagram showing an embodiment of a method 160 for determining a time that an object remains at a location. The method comprises a first block 162 representing a step of obtaining an image of a predetermined space. The predetermined space may be a location where a vehicle or human receives service or a line or queue in which the vehicle or human waits to begin receiving a service. From the image of the predetermined space, the method 160 includes a decision diamond 164, indicating a step of determining if a recognizable object occupies at least a predetermined amount of the predetermined space. This can be detected by changes in the images from an empty space to a space being occupied by a predetermined type of object. For example, if the object having a certain volume in the camera view is present, then the object may be recognized. If a recognizable object is not detected, the method loops back to decision diamond 164 until an object is detected.

When it is determined in decision diamond 164 that a recognizable object has been detected in the space, the method includes a block 166 of starting a timer when the recognizable object first enters the predetermined space. In some embodiments, the method 160 may also include a block 168 for displaying the image to either a customer or to a shop manager. The image may be a video or single snapshot. The display may also include a running time indicating how long the object has been receiving service. The method 160 further includes decision diamond 170, which determines if the recognizable object still occupies at least the predetermined amount of the space. This can be done using the same camera used to determine when the object originally enters the space, associated with decision diamond 164. If the object still occupies the space, the method 160 loops back to block 168 where updated video or snapshots of the object can be displayed.

However, if it is determined in decision diamond 170 that the object no longer occupies the space, then the method 160 proceeds to block 172, which indicates that the timer is stopped to designate the time when the recognizable object leaves the predetermined space. The method 160 also includes block 174, which determines an amount of time that the recognizable object remains in the predetermined space, which is calculated by the difference between the start time and the end time to determine the elapsed time.

Additional methods may include a step of determining the start times and end times for a plurality of recognizable objects that enter and leave the predetermined space. The methods may further include the step of counting the number of recognizable objects that enter and leave the predetermined space over a predetermined period of time, such as within an hour or a day. The methods may further comprise the step of determining an average elapsed time based on the number of recognizable objects that enter and leave the predetermined space and the determined amounts of time that each recognizable object remains in the predetermined space.

The methods may further include a first step of determining an average elapsed time of a number of objects for each of a plurality of predetermined spaces located at a plurality of service facilities. Then, the methods may also include determining an estimated wait time at each service facility. The methods may then upload the estimated wait times to enable a user to access the estimated wait times using a mobile application.

In some embodiments, the methods may further include steps of determining a running time indicative of an amount of time that the recognizable object has been in the predetermined space and displaying the running time to a customer.

It should be known that the system 10 may be able to distinguish recognizable objects from those that do not meet certain image criteria. For example, the object/space tracking module 42 may be configured to determine when a vehicle is in the bay, as opposed to maybe a tool box or a person standing in the bay. The system 10 may utilize clearly defined "lanes" that are drawn when the system 10 is first set up at each location and when cameras 12 are installed. Once the vehicle enters into the clearly defined zones drawn in the bay, the system 10 can begin to time the services.

Figure 10A:
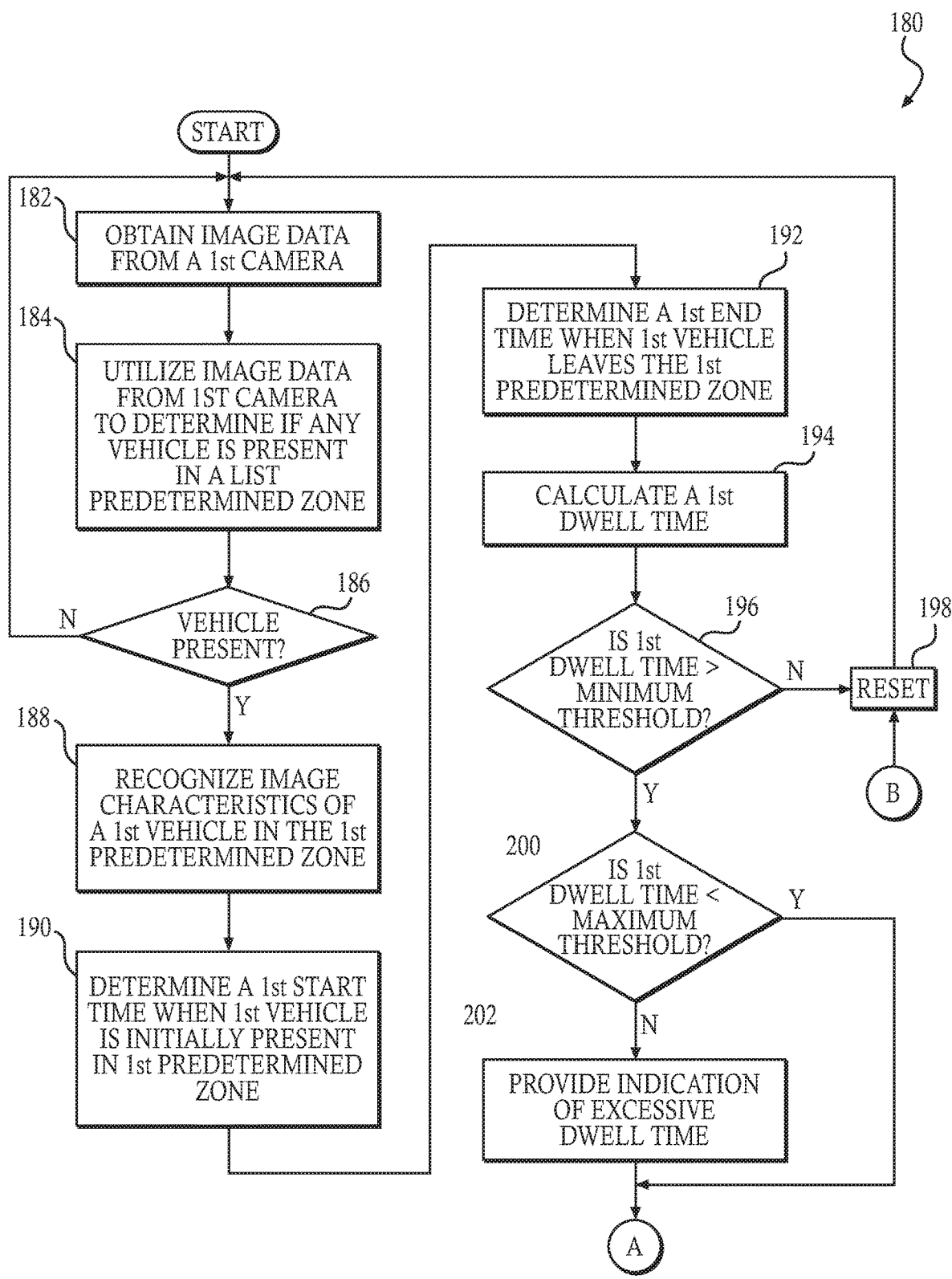
FIGS. 10A and 10B together form a flow diagram showing a method for determining dwell times at first and second predetermined zones, according to one embodiment.
Figure 10B:
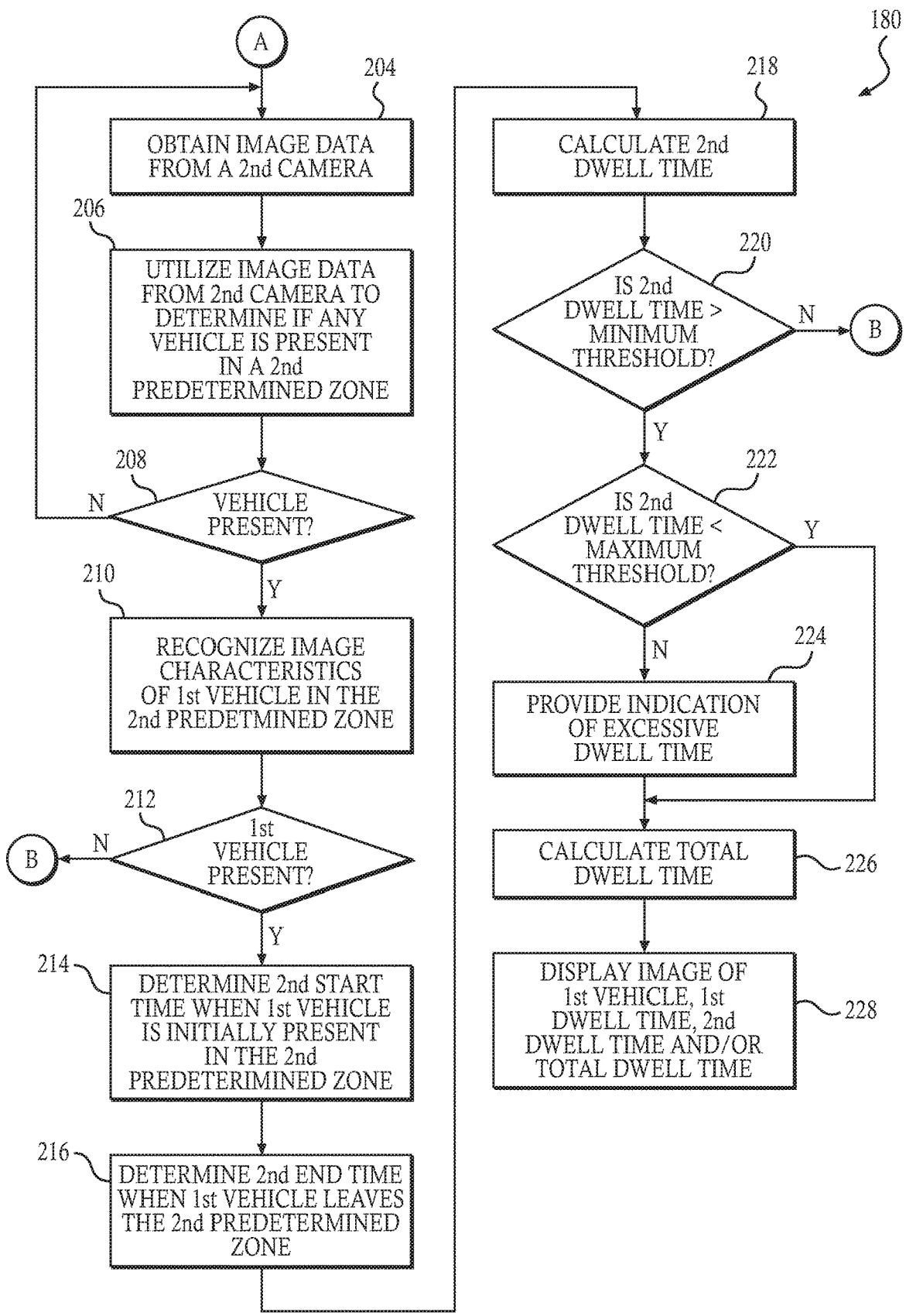

FIG. 10 (i.e., FIGS. 10A and 10B) is a method 180 for tracking service wait times for a vehicle. FIG. 10 may be performed after cameras 12 and a computer system 14 are installed in a service shop or in a service lane.

The method 180 includes the step of obtaining image data from a first camera, as indicated in block 182. The method 180 also includes utilizing the image data from the first camera to determine if any vehicle is present in a first predetermined zone. In some embodiments, the method 180 may include utilizing the image data to determine if a first condition is met, whereby the first condition is met when any vehicle occupies at least an amount of space in the first predetermined zone that is greater than a first predetermined threshold. The first predetermined threshold may be a minimum volume in the camera view that must change for the method to detect that a vehicle is present, as opposed to a smaller object.

In decision diamond 186, the method 180 indicates that a determination is made as to whether a vehicle is present. If no vehicle is present, the method 180 loops back to block 182 to obtain additional image data. If it is determined in decision diamond 186 that a vehicle is present, the method proceeds to block 188. As indicated in block 188, the method 180 includes the step of recognizing image characteristics of a first vehicle in the first predetermined zone.

As indicated in block 190, the method 180 determines a first start time when the first vehicle is initially present in the first predetermined zone. In other words, the first start time is indicative of when the above-mentioned first condition is first met by the first vehicle. Block 192 indicates a step of determining a first end time when the first vehicle leaves the first predetermined zone. This determination can be made by detecting the first end time, which occurs after the first start time, when the first condition is no longer met by the first vehicle.

The method 180 further includes the step of calculating a first dwell time, as indicated in block 194, representing the time that the first vehicle remains in the first predetermined zone. The first dwell time can be calculated from the first start time and the first end time.

In some embodiments, the method 180 may also include decision diamonds 196 and 200 for comparing the dwell time with minimum and maximum thresholds. As indicated in decision diamond 196, the method 180 determines if the first dwell time is greater than a minimum threshold. If it does not exceed the minimum threshold, representing a condition in which a vehicle occupies the first predetermined zone for too short of a time to be considered as a customer receiving service, the method 180 goes to block 198, which indicates that the time is reset and the method 180 returns back to the beginning to start again. However, if the first dwell time exceeds the minimum threshold, the method 180 proceeds to decision diamond 200.

Decision diamond 200 indicates that the method 180 determines if the first dwell time is less than a maximum threshold. If not, indicating that service has taken too long (e.g., based on preset goals), then the method goes to block 202, which indicates that an indication is provided that an excessive amount of time has been taken to service the vehicle. In some embodiments, the indication may be an audio signal or a visual signal (e.g., changing a color of an indication to red). However, if the first dwell time is found to be below the maximum threshold in decision block 200, the method 180 jumps ahead to "A," which resumes in FIG. 10B. The steps shown in FIG. 10A may represent the actions taken with respect to a single camera, whereas the steps shown in FIG. 10B may represent the actions taken with respect to a second camera.

As shown in FIG. 10B, the method 180 includes the step of obtaining image data from a second camera according to block 204. The method 180 utilizes the image data from the second camera (i.e., block 206) to determine if any vehicle is present in a second predetermined zone. In some embodiments, the presence of a vehicle can be determined by detecting if a second condition is met, whereby the second condition is met when any vehicle occupies at least an amount of space in the second predetermined zone that is greater than a second predetermined threshold.

Method 180 further includes determining if a vehicle is present, as determined with respect to decision diamond 208. If not, the method 180 returns back to block 204 to continue obtain image data from the second camera. However, if a vehicle is detected as being present, the method 180 proceeds to block 210. As indicated in block 210, a step is performed to recognize image characteristics of the first vehicle in the second predetermined zone. As indicated in decision diamond 212, the method 180 determines if the recognized image characteristics are shared with the first vehicle to detect if it is the same vehicle. If not, then in some embodiments, the method 180 may proceed to "B," which leads to block 198 shown in FIG. 10A to reset the timers and return to the beginning of the method 180. If, on the other hand, the vehicle is the same vehicle (i.e., the first vehicle), then the method 180 proceeds to block 214.

As indicated in block 214, a step of determining a second start time is conducted, the second start time being a time when the first vehicle is initially present in the second predetermined zone. Determining that the first vehicle is present may be performed by determining when the second condition (detected in block 206) is first met by the first vehicle. As indicated in block 216, the method 180 includes determining a second end time when the first vehicle leaves the second predetermined time. This determination can be made by detecting, after the second start time, when the second condition is no longer met by the first vehicle.

Method 180 further includes calculating a second dwell time, as indicated by block 218, which may be calculated from the second start time and the second end time. The method 180 may further include determining if the second dwell time is greater than a minimum threshold. If not, then the method 180 may be reset. If so, the method 180 may proceed to decision diamond 222, which indicates that it is determined whether the second dwell time is less than a maximum threshold. If it is, the method 180 skips block 224. Otherwise, block 224 is executed, which includes the step of providing an indication that an excessive dwell time has been reached or surpassed.

From the first dwell time (i.e., block 194) and the second dwell time (i.e., block 218), a total dwell time can be calculated, as indicated in block 226. As indicated in block 228, the method 180 includes a step of displaying one or more aspects of the services. For example, the displaying step may include displaying an image of the first vehicle, displaying the first dwell time, displaying the second dwell time, and/or displaying the total dwell time. This information can be displayed on a display screen that is designated for use by a customer or by a worker at the service facility.

These and other embodiments are considered to be within the spirit and scope of the present disclosure and are not limited to the examples discussed above.

The invention claimed is:

1. A system comprising:
   a plurality of locations, wherein each location comprises:
      a camera mounted in a building and configured to capture an image of a vehicle in a predetermined space within the building; and
      a processor configured to, for each vehicle entering the predetermined space:
         utilize the image from the first camera to determine if a vehicle occupies at least an amount of space in the predetermined space greater than a predetermined threshold;
         determine a start time when the vehicle is determined to have entered the predetermined space based on the determining, using the image from the first camera, that the vehicle occupies the at least an amount of space in the predetermined space greater than the predetermined threshold;
         determine an end time when the vehicle leaves the predetermined space based on the determining, using another image of the first camera, that the vehicle occupies the at least an amount of space in the predetermined space greater than the predetermined threshold;
         calculate an elapsed time, based on the determined start time and the determined end time which were both determined using the first camera, when the vehicle remained in the predetermined space; and
         increment a counter by one,
         wherein (1) the counter for each location indicating a total vehicle count and (2) an average of the elapsed times for each location are accessible to drivers of the vehicles prior to arriving at the locations.

2. The system of claim 1, wherein the processor is configured to determine the start times and end times for a plurality of vehicles that enter and leave the predetermined space.

3. The system of claim 2, wherein the processor is further configured to count the number of vehicles that enter and leave the predetermined space over a period of time.

4. A system comprising:
   a camera configured to capture an image of each vehicle entering in a predetermined space located inside of a building;
   a processor configured to determine a start time when the vehicle enters the predetermined space using the camera based on a vehicle occupying at least an amount of space in the image that is greater than a predetermined threshold, determine an end time when the vehicle leaves the predetermined space using the camera, and calculate an elapsed time, based on the start time and the end time, when the vehicle remained in the predetermined space,
   wherein an average elapsed time is calculated and accessible to vehicle drivers prior to arriving at the building.

5. The system of claim 4, wherein the processor is configured to determine the start times and end times for a plurality of vehicles that enter and leave the predetermined space.

6. The system of claim 5, wherein the processor is further configured to count the number of vehicles that enter and leave the predetermined space over a period of time.

7. The system of claim 6, wherein the processor is further configured to determine an average elapsed time based on the number of vehicles that enter and leave the predetermined space and the elapsed time that each vehicle remained in the predetermined space.

8. The system of claim 7, further comprising a plurality of predetermined spaces of a service facility and a plurality of cameras each configured to capture an image of a vehicle in a respective predetermined space, wherein the processor is configured to determine an average elapsed time for each of the predetermined spaces.

9. The system of claim 8, wherein the plurality of predetermined spaces are located at a plurality of service facilities, and wherein the processor is configured to determine an estimated wait time at each service facility and upload the estimated wait times to a server configured to enable a user to access the estimated wait times using a mobile application.

10. The system of claim 4, further comprising a plurality of predetermined spaces in a vehicle lane and a plurality of cameras, wherein each camera corresponds to a respective predetermined space;
wherein the processor is configured to determine a start time when the vehicle enters each predetermined space, determine an end time when the vehicle leaves each predetermined space, and calculate dwell times, based on the start times and the end times, when the vehicle remains in each of the predetermined spaces.

11. The system of claim 10, wherein the processor is configured to recognize image characteristics of the vehicle in each predetermined space to distinguish one vehicle from another.

12. The system of claim 4, wherein the processing device is configured to determine a running time indicative of an amount of time that the recognizable object has been in the predetermined space.

13. The system of claim 12, further comprising a display device configured to display the running time to a customer.

14. A method comprising:
for each of plurality service facilities:
determining a start time when a vehicle enters a predetermined space based on processing an image capturing the predetermined space inside a building;
determining an end time when the vehicle leaves the predetermined space based on processing a second image captured at the predetermined space;
determining a dwell time that the vehicle remains in the predetermined space, the dwell time determined from the start time and the end time;
determining an average elapsed time of each of a plurality of predetermined spaces located at the plurality of service facilities;
determining an estimated wait time at each of the plurality of service facilities; and
uploading the estimate wait times to enable a user to access the estimated wait times using a mobile application that is accessible to the vehicle drivers prior to arriving at the plurality of service facilities.

15. The method of claim 14, further comprising the step of determining the start times and end times for a plurality of vehicles that enter and leave the predetermined space.

16. The method of claim 15, further comprising the step of counting the number of vehicles that enter and leave the predetermined space over a period of an hour, a portion of a day, a day, a week, a month, or a year.

17. The method of claim 16, further comprising the step of determining an average elapsed time based on the number of vehicles that enter and leave the predetermined space and the determined amount of time that each vehicle remains in the predetermined space.

18. The method of claim 17, further comprising the steps of:
determining an average elapsed time of each of a plurality of predetermined spaces located at a plurality of service facilities;
determining an estimated wait time at each service facility; and
uploading the estimate wait times to enable a user to access the estimated wait times using a mobile application.

19. The method of claim 14, further comprising the step of determining a running time indicative of an amount of time that the vehicle has been in the predetermined space.

20. The method of claim 19, further comprising the step of displaying the running time to a customer.

* * * * *